Figure 1:
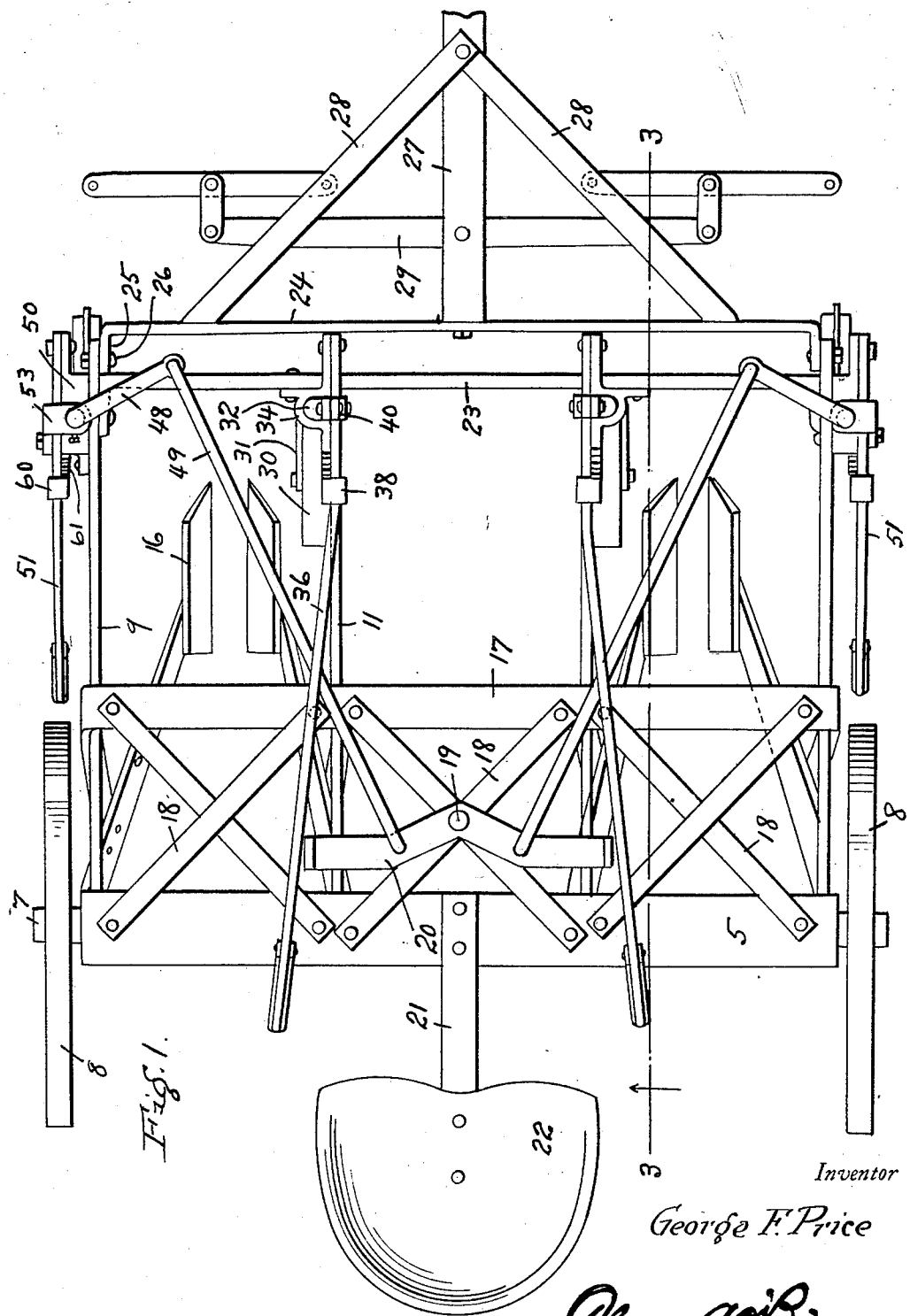

April 14, 1931.  G. F. PRICE  1,800,751
TWO-ROW BEET DIGGER
Filed Nov. 26, 1928  5 Sheets-Sheet 1

Inventor
George F. Price
By Clarence A. O'Brien
Attorney

April 14, 1931. G. F. PRICE 1,800,751
TWO-ROW BEET DIGGER
Filed Nov. 26, 1928 5 Sheets-Sheet 4

Inventor
George F. Price
By Clarence A. O'Brien
Attorney

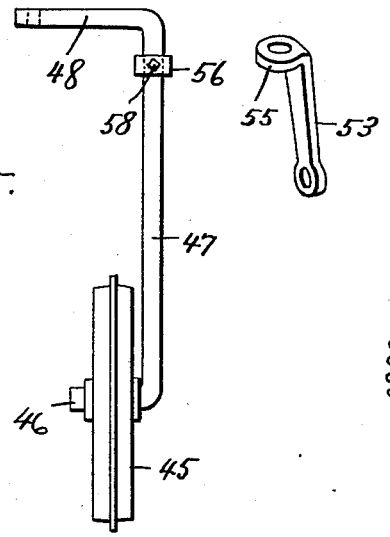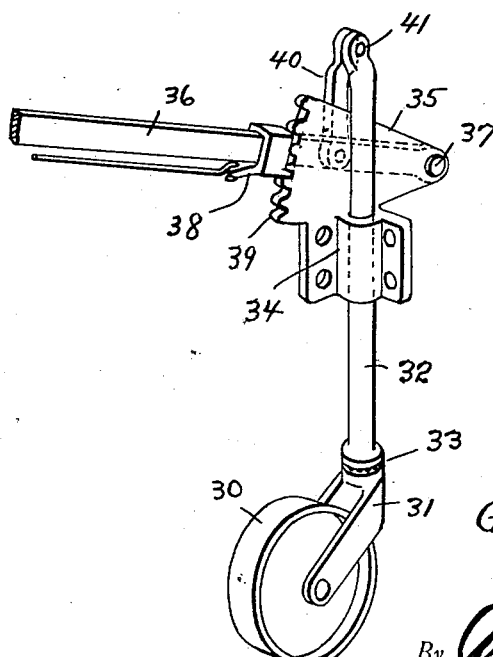

Patented Apr. 14, 1931

1,800,751

UNITED STATES PATENT OFFICE

GEORGE F. PRICE, OF HERSHEY, NEBRASKA

TWO-ROW BEET DIGGER

Application filed November 26, 1928. Serial No. 321,922.

The present invention relates to a beet digger and has for its prime object to provide a structure capable of digging two rows of beets at the same time.

Another object of the invention resides in the provision of a two-row beet digger of this nature mounted on a wheeled frame with adjustable means associated therewith so that the frame may be manipulated to engage the digging element at the desired depth in the ground or to clear them from the ground entirely.

A still further very important object of the invention resides in the provision of a two-row beet digger of this nature which has its parts arranged in an exceedingly compact and convenient manner to afford ease of operation and manipulation so as to attain an effective control by a single attendant.

A still further very important object of the invention resides in the provision of a two-row beet digger of this nature which is simple in its construction, strong and durable, inexpensive to manufacture, thoroughly efficient in its use, and otherwise well adapted to the purpose for which it is designed With the above and numerous other objects in view as will appear as the description proceeds, the invention resides in certain novel features of construction, and in the combination and arrangement of parts as will be hereinafter more fully described and claimed.

Figure 2:
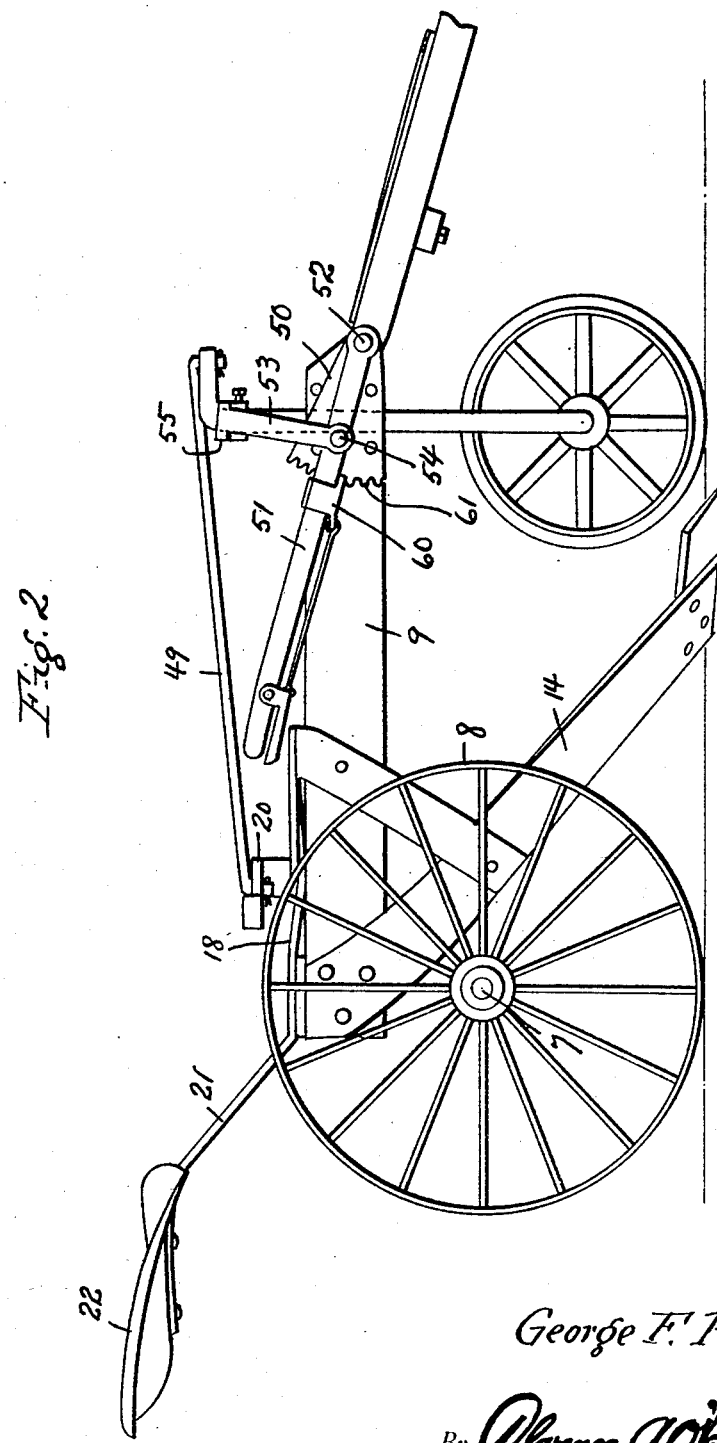
Figure 3:
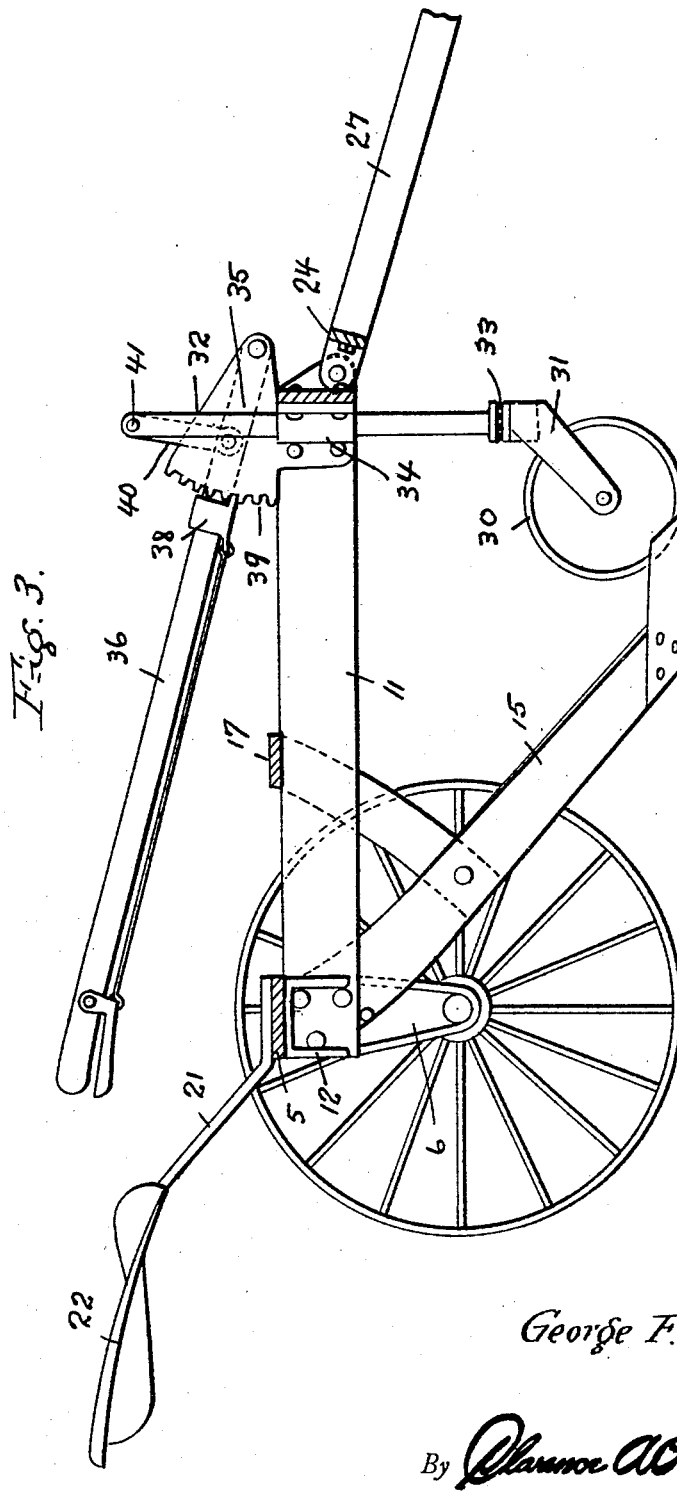
Figure 4:
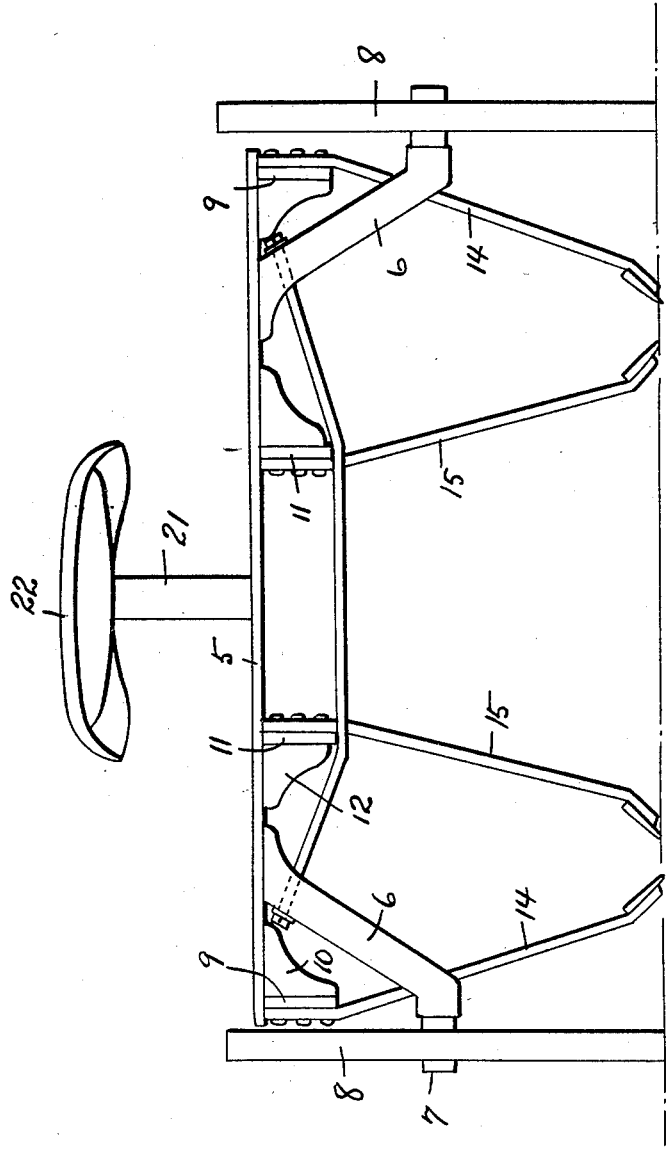

In the drawing:

Figure 1 is a top plan view of the two-row beet digger embodying the features of my invention, Figure 2 is a side elevation thereof, Figure 3 is a longitudinal vertical section taken substantially on the line 3—3 of Figure 1, with certain of the braces removed, Figure 4 is a rear elevation of the digger, Figure 5 is a detail elevation of the guide wheels, Figure 6 is a perspective view of a link, Figure 7 is a perspective view of a notched segment, and Figure 8 is a perspective view of a raising and lowering wheel unit.

Referring to the drawing in detail, it will be seen that numeral 5 denotes a rear cross bar which has fixed adjacent the ends thereof depending brackets 6 which incline outwardly and terminate in stub axles 7 on which are rotatable rear wheels 8.

Side bars 9 are fixed to the ends of the frame bar 5 and project forwardly therefrom and are braced by suitable means 10. Longitudinal bars 11 extend forwardly from the rear bar 5 being fixed thereto by suitable means 12. Bars 11 are located to each side of the center of the bar 5 and are equidistant inwardly from the bars 9.

Shanks 14 and 15 are fixed respectively to the rear end of the bars 9 and 11 and incline downwardly and forwardly and converge downwardly toward each other to terminate in spaced relation and digging elements 16 are fixed to their lower ends to extend alongside of each other so as to provide a pair for each row of beets. A U-shaped cross bar 17 has its bight portion extending across the bars 9 and 11 and its ends inclining downwardly and rearwardly and secured to upper intermediate portions of the shanks 14. Three pair of cross braces 18 are disposed between the bight of the cross bar 17 and the rear bar 5.

On the center pair there is rockably mounted intermediate its ends as at 19 a steering member 20. A seat shank 21 projects rearwardly from the center of the bar 5 and has its seat 22 on the end thereof. A cross front bar 23 is disposed between the forward portions of the side bars 9 and the forward ends of the longitudinal bars 11 are also fixed thereto.

A hitched cross bar 24 has offset ends 25 pivotally engaged as at 26 with the forward end of the side bars 9. A tongue 27 projects from the center of the hitch bar and braces 28 are disposed between an intermediate portion of the tongue 27 and the end portions of the hitch bar 24.

An equilizer 29 is mounted on the tongue so that draft animals may be used to pull the apparatus forwardly.

A pair of casters 30 are mounted in yokes 31 swiveled on the lower ends of the shanks 32 as at 33. The shanks 32 are slidable vertically in the bearings 34 fixed to bars 11 and 23. A segment 35 is formed on each of the bearings 34 and has a lever 36 pivotally engaged therewith as at 37 and provided with detent means 38 to cooperate with teeth 39 on the quadrant.

A link 40 is pivotally connected as at 41 with the upper end of the shank and with an intermediate portion of the lever 36 adjacent the pivot connection 37 and it will thus be seen that means for sliding the shanks to raise and lower the forward end of the frame has been provided.

The casters are used when the implement is merely being moved along the ground to put the same in place or to take the same to the shed. A pair of guide wheels 45 are journaled on lateral extensions 46 of shanks 47 which have lateral arms 48 at their upper ends with which are connected links 49 also connected with the steering member 20. The shanks 47 are mounted in bearings on the forward portion of the frame at the sides thereof, said shanks being rotatable and slidable through the last mentioned bearings. The member 20 and the links 49 provide manually operable means for rocking the last named shanks to steer the apparatus and the levers 51 and the links 53 provide means for raising and lowering the last mentioned shanks to lower and raise the forward end of the frame.

Segments 50 are mounted on the forward portions of the bars 9 and have levers 51 pivotally engaged therewith as at 52 and links 53 are pivotally engaged with the levers 51 as at 54 and have eyes 55 at their upper ends to receive the upper ends of the shanks 47 above collars 56 fixed to the shanks by means of set screws 58.

The levers 51 are provided with detents 60 for cooperating with teeth 61 on the segment 50. Thus by manipulating the lever 51 the depth at which the plows or diggers 16 will operate in the ground may be controlled and the apparatus may be steered independently of the draft animals so as to follow the road accurately.

When the machine is in use, the supporting area of all four of the forward wheels may be utilized when the machine is traveling over the comparatively soft ground in a beet field, for preventing same from sinking into the ground and forming ruts therein. When utilized in this manner the machine may be caused to follow the rows, which may have irregularities therein, through the medium of the two steering wheels, this being permitted by the remaining two wheels by reason of the fact that they are swivelly mounted. In addition to this, the vertically adjustable swivelly mounted wheels provide means whereby the forward end of the frame and the beet lifting elements may be raised out of engagement with the ground when it is desired to transport the machine from place to place.

It is thought that the construction, operation, utility and advantages of this invention will now be quite apparent to those skilled in this art without a more detailed description thereof.

The present embodiment of the invention has been disclosed in considerable detail merely for the purposes of exemplification since in actual practice it attains the features of advantage enumeratel as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. An apparatus of the class described including a frame, wheel supports for the rear end of the frame, beet digging means, means for suspending the beet digging means from the rear end of the frame to be disposed under an intermediate portion thereof, a pair of bearings fixed to the forward portion of the frame, shanks slidable in the bearings vertically, yokes swiveled on the shanks, wheels journaled in the yokes, and means for sliding the shanks to raise and lower the forward end of the frame, bearings on the forward portion of the frame at the sides thereof, shanks rotatable and slidable through the last mentioned bearings, and wheels on the last mentioned shanks.

2. An apparatus of the class described including a frame, wheel supports for the rear end of the frame, beet digging means, means for suspending the beet digging means from the rear end of the frame to be disposed under an intermediate portion thereof, a pair of bearings fixed to the forward portion of the frame, shanks slidable in the bearings vertically, yokes swiveled on the shanks, wheels journaled in the yokes, and means for sliding the shanks to raise and lower the forward end of the frame, bearings on the forward portion of the frame at the sides thereof, shanks rotatable and slidable through the last mentioned bearings, wheels on the last mentioned shanks, and means for rocking the last mentioned shanks to steer the apparatus.

3. An apparatus of the class described including a frame, wheel supports for the rear end of the frame, beet digging means, means for suspending the beet digging means from the rear end of the frame to be disposed under an intermediate portion thereof, a pair of bearings fixed to the forward portion of the frame, shanks slidable in the bearings vertically, yokes swiveled on the shanks, wheels journaled in the yokes, and means for sliding the shanks to raise and lower the forward end of the frame, bearings on the forward portion of the frame at the sides thereof, shanks rotatable and slidable through the last mentioned bearings, and wheels on the last mentioned shanks, means for rocking the last mentioned shanks to steer the apparatus, and means for raising and lowering the last mentioned shanks to lower and raise the forward end of the frame.

In testimony whereof I affix my signature.

GEORGE F. PRICE.